United States Patent [19]

Cosman et al.

[11] Patent Number: 5,748,867
[45] Date of Patent: May 5, 1998

[54] IMAGE TEXTURING SYSTEM HAVING THEME CELLS

[75] Inventors: Michael Cosman, South Jordan; Thomas C. Brown, Salt Lake City, both of Utah

[73] Assignee: Evans & Sutherland Computer Corp., Salt Lake City, Utah

[21] Appl. No.: 88,447

[22] Filed: Jul. 6, 1993

Related U.S. Application Data

[63] Continuation-in-part of Ser. No. 837,827, Feb. 18, 1992, abandoned.

[51] Int. Cl.$^6$ .................................................. G06T 11/40
[52] U.S. Cl. ........................... 395/130; 395/128; 395/129
[58] Field of Search .............................. 395/129, 125, 395/127, 120, 119, 128, 134, 130

[56] References Cited

U.S. PATENT DOCUMENTS

| | | | |
|---|---|---|---|
| 3,816,726 | 6/1974 | Sutherland et al. | 395/134 X |
| 4,586,038 | 4/1986 | Sims et al. | 395/130 |
| 4,645,459 | 2/1987 | Graf et al. | 434/43 |
| 4,677,576 | 6/1987 | Berlin, Jr. et al. | 395/120 |
| 4,821,212 | 4/1989 | Heartz | 395/126 |
| 4,868,771 | 9/1989 | Quick et al. | 395/119 X |
| 4,899,293 | 2/1990 | Dawson et al. | 395/123 |

(List continued on next page.)

FOREIGN PATENT DOCUMENTS

| | | | |
|---|---|---|---|
| WO 85/00913 | 2/1985 | WIPO | G09B 9/08 |
| WO 88/02156 | 3/1988 | WIPO | G06F 15/72 |

OTHER PUBLICATIONS

Foley et al., "ComputerGraphics Principles & Practice", 1990, Plates 11.21–11.24, 11.33–11.36, 1.5.

Devich et al.; Rural Scene Perspective Transformations; 1981; pp. 54–66.

Heckbert, Paul S.; Survey of Texture Mapping; 1986; pp. 56–67.

Ohshima et al.; An Animation Design Tool Utilizing Texture; 1989; pp. 337–342.

Kleiss, James A.; Tradeoffs Among Types of Scene Detail For Simulating Low–Altitude Flight; Aug. 1992; pp. 1141–1146.

Fox, Teresa A., and Clark, Philip D., "Development Of Computer–Generated Imagery For A Low Cost Real–Time Terrain Imaging System," *IEEE 1986 National Aerospace and Electronics Conference NAECON 1986*, vol. 3, 1986, pp. 986–991.

*Primary Examiner*—Mark K. Zimmerman
*Attorney, Agent, or Firm*—Darby & Darby, P.C.

[57] ABSTRACT

An image texturing system utilizes theme cells to generate terrain image data area-by-area for a dynamic terrain display. The system is effective in flight simulation apparatus, as for training pilots. A memory stores theme maps representing areas of specific terrains, e.g. terrains lying below a flight path. The theme maps are indexed on a square grid pattern and include a feature identification code (FIC) for each grid point to indicate terrain, e.g. forest, water, etc. A selection device controlled by an image generator selects a current theme map and dissects it cell-by-cell as defined by grid points to provide corner-referenced representations for each theme cell. A terrain storage device stores a library of terrain treatment pattern arrays that are derived, for example, from photo data of forest, ocean, or the like. A terrain treatment pager controlled by the image generator provides representations of select terrain treatments indicated for a current theme cell and selects the terrain treatment required for texturing the current theme cell. A theme element assembler receives the representations for the current theme cell and the select terrain treatments. The cell is specified according to rules for representing one or more terrain treatments. When the range closes to a distance where features would be discernable, representative three-dimensional data for specific objects, e.g. houses, is provided for displays on specific locations. At some point in a flight path, geo-specific data may replace the semi-specific data of simulated terrain.

35 Claims, 7 Drawing Sheets

U.S. PATENT DOCUMENTS

| | | | |
|---|---|---|---|
| 4,974,176 | 11/1990 | Buchner et al. | 395/128 |
| 4,985,854 | 1/1991 | Wittenburg | 395/126 |
| 5,179,638 | 1/1993 | Dawson et al. | 395/125 |
| 5,194,969 | 3/1993 | DiFrancesco | 358/463 |
| 5,214,757 | 5/1993 | Mauney et al. | 395/161 |
| 5,317,689 | 5/1994 | Nack et al. | 395/163 |
| 5,367,615 | 11/1994 | Economy et al. | 395/129 |
| 5,379,371 | 1/1995 | Usami et al. | 395/128 |

IMAGE TEXTURING SYSTEM HAVING THEME CELLS

This is a continuation-in-part of application Ser. No. 07/837,827, filed Feb. 18, 1992, now abandoned.

FIELD OF THE INVENTION

This invention relates generally to a computer graphics system for use with image generators. More specifically, the invention relates to systems for generating data for simulating areas of terrain in dynamic displays.

BACKGROUND AND SUMMARY OF THE INVENTION

Numerous applications exist for simulated dynamic visual images of terrain representing specific areas of the world. One such use is in flight simulation systems for training pilots. Typically, flight simulation systems display the terrain along a particular path of flight. Accordingly, flight simulation systems enable pilots to become familiar with a flight path prior to undertaking the actual flight.

Typically, in the operation of flight simulators, computer-generated images are viewed as windows from a mock cockpit, presented on one or more display devices, such as a CRT (cathode ray tube). The displayed scenes are generated in real time and produce the illusion of actually looking through a cockpit window at the passing terrain below. In current simulators, the illusion is sufficiently realistic to permit the substitution of training by flight simulator for a significant part of a pilot training curriculum.

Typically, in producing dynamic images of a terrain in real time, data from terrain maps is retrieved from online data bases. However, generating geo-specific images (high resolution images specific for the actual terrain to be traversed) is not always possible or practical. For example, a problem arises in storing the vast amount of required data. Even if large amounts of memory are available, the extent of the simulated terrain remains somewhat limited. Consequently, improved systems are needed to provide quality simulated terrain displays with reduced storage requirements.

Generally, simulated terrain images can be provided by utilizing data taken from aerial photography and/or satellite images. However, such techniques involve relatively great expense. A system using aerial photographs to produce images is disclosed in U.S. Pat. No. 4,985,854, entitled "Method For Rapid Generation of Photo-Realistic Imagery".

Typically, simply blending different aerial photographs or imaging photo data obtained from satellites is somewhat ineffective, creating rather undefined and fragmented images. As with a panoramic scene formed by joining separate photographs, annoying seams usually dissect the image, fragmenting objects as houses or forests. Such distortions in a simulator display tend to distract the pilot, depart from realism and accordingly hinder the training value of a system.

To minimize the distortions and improve the quality of images, considerable photo data and a great deal of time has been required to assemble data effectively. The requirements impose a disadvantage for the rapid real time generation of dynamic images, particularly for images that are required only for limited uses, for example, a one-time training use. Usually, in such applications, the sizable expense of collecting and processing the photo data for limited use is neither desirable nor practical. Thus, a need exists for an improved simulated display data system as related to economy, image quality, ease of developing, and storage capacity.

The present invention comprises an improved dynamic display system utilizing theme cells to facilitate the generation of terrain image data. In that regard, the image texturing system of the present development may be combined effectively with traditional systems.

The present image texturing system includes a memory means for storing theme maps representing specific terrains, e.g. including anticipated flight routes. The theme maps are disposed on a square grid pattern and have feature identification codes (FIC's) available for each grid point. Sets of four contiguous grid points define squares or blocks that are treated as theme cells.

A selection means controlled by the image generator selects a current theme map and dissects it cell-by-cell to provide a sequence of theme cell representations. For example, theme maps may be dissected in a raster pattern, treating the defined cells in sequence. The feature identification codes then specify the terrain at the four corners of each theme cell. Specifically, a generic terrain is indicated for each of the four corners of each cell. As suggested, terrain representations may include: forest, ocean, industrial, residential, agricultural, and so on.

A terrain storage library contains a plurality of generic terrain characteristics treatments, e.g. residential, that can be used to texture theme cells. The generic treatments represented by stored data may be derived from photo data.

In the system, a terrain treatment pager is controlled by the image generator to provide representations of generic terrains specified for a current theme cell based on the FIC corner terrain data. A theme element assembler receives the representations for the current theme cell along with the terrain treatments and provides representations for the cell that may include one or more terrain characteristics. Accordingly, each theme cell is textured to provide a representative generic terrain display data.

A theme-element set storage or memory provides a library containing three-dimensional data for a plurality of features or objects, e.g. houses. As the range on a terrain closes, objects can be placed on specific compatible footprints identified in the texture of a theme cell. Thus, three-dimensional objects, increasing in number as the range closes, are displayed on the generic areas of terrains. In an expanded simulator application, as disclosed herein, the generic system provides an effective supplement for use in combination with geo-specific terrain images using current technology.

In composing a dynamic image for a flight simulator, the present invention may be embodied in an expanded system wherein only 1% of the simulated terrain is high resolution (geo-specific). That is, only 1% of the terrain data is constructed of geo-specific detailed images. The other 99% of the simulated terrain is semi-specific and semi-accurate (bordering the important 1%) for background and for areas encountered when a pilot accidentally veers off course.

Of the 99% portion of a dynamic display as considered, portions also may display three-dimensional objects, e.g. a house, should the range close to a distance at which such detailed images would be seen. That is, because the simulated terrain represented by generic-terrain texture is two-dimensional or flat, it tends to be misleading if the range closes. To reduce the problem, in the system as disclosed, when a generic two-dimensional area is approached by the viewer, e.g. the range closes, three-dimensional objects emerge from two-dimensional footprints.

In the disclosed system, when the need for true realism occurs, as at a target area, for example an airport, the semi-specific, semi-accurate image yields to a high resolution geo-specific picture affording views of actual objects in the scene. Thus, the system comports application needs to practical capability.

Perhaps it is noteworthy that if 100% of a typical flight-path terrain were to be represented with geo-specific detail for a simulator, the data base would require some 52 gigabytes of storage. Such capacity is impractical in the light of present data technology. Accordingly, the system as disclosed in detail below affords an effective technology, as for example, in combination with geo-specific data.

In accordance with embodiments of the present invention, the image texturing system accomplishes sinuous boundaries between regions of natural terrain, such as ocean and forest (organic) and straight boundaries between man-made regions (inorganic) such as residential areas. Also, patchwork appearances are avoided in displays by avoiding the repeated use of theme patterns. These, as well as several other features of the invention, will become apparent from the detailed description which follows, considered together with the appended drawings.

BRIEF DESCRIPTION OF THE DRAWINGS

In the drawings, which constitute a part of this specification and in which like reference numerals indicate like parts, exemplary embodiments of the present invention exhibiting various objectives and features thereof are set forth. Specifically.

DETAILED DESCRIPTION OF THE DISCLOSED EMBODIMENT

As required, a detailed illustrative embodiment of the present invention is disclosed herein. However, the computer graphics system and image generator described in connection with the present invention may be embodied in a wide variety of distinct forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Essentially, the system as disclosed herein can provide a dynamic display, for example, simulating the view from an aircraft as it flies from one location to another. A composite form of the system utilizes different simulation techniques and data sources depending on the stage and conditions of the flight. For example, when the aircraft is flying at a high altitude, semi-accurate two-dimensional data is displayed to semi-specifically represent the terrain. Where water exists, water is displayed. Where forest exists, forest is displayed. However, the displayed forest, water or other terrain is a generic representation of a terrain characteristic taken from a treatment array memory or library.

When the aircraft descends to a lower altitude, closing the range to the terrain, the generic two-dimensional display is supplemented with three-dimensional objects. For example, a house may be taken from a theme-cell set memory and positioned on a matching footprint of the two-dimensional generic terrain. As the range closes, additional objects may be provided as in the form of buildings. Thus, although the display is generic, it continues to be somewhat accurate, somewhat specific and appears quite realistic.

When the aircraft approaches a target area, for example, a landing strip, the system can utilize photo data to provide a three-dimensional geo-specific display. During such operation, specific buildings and specific terrain characteristics are displayed as by using techniques well known in the prior art. An exemplary flight path utilizing the three data formats now will be considered.

Figure 1:
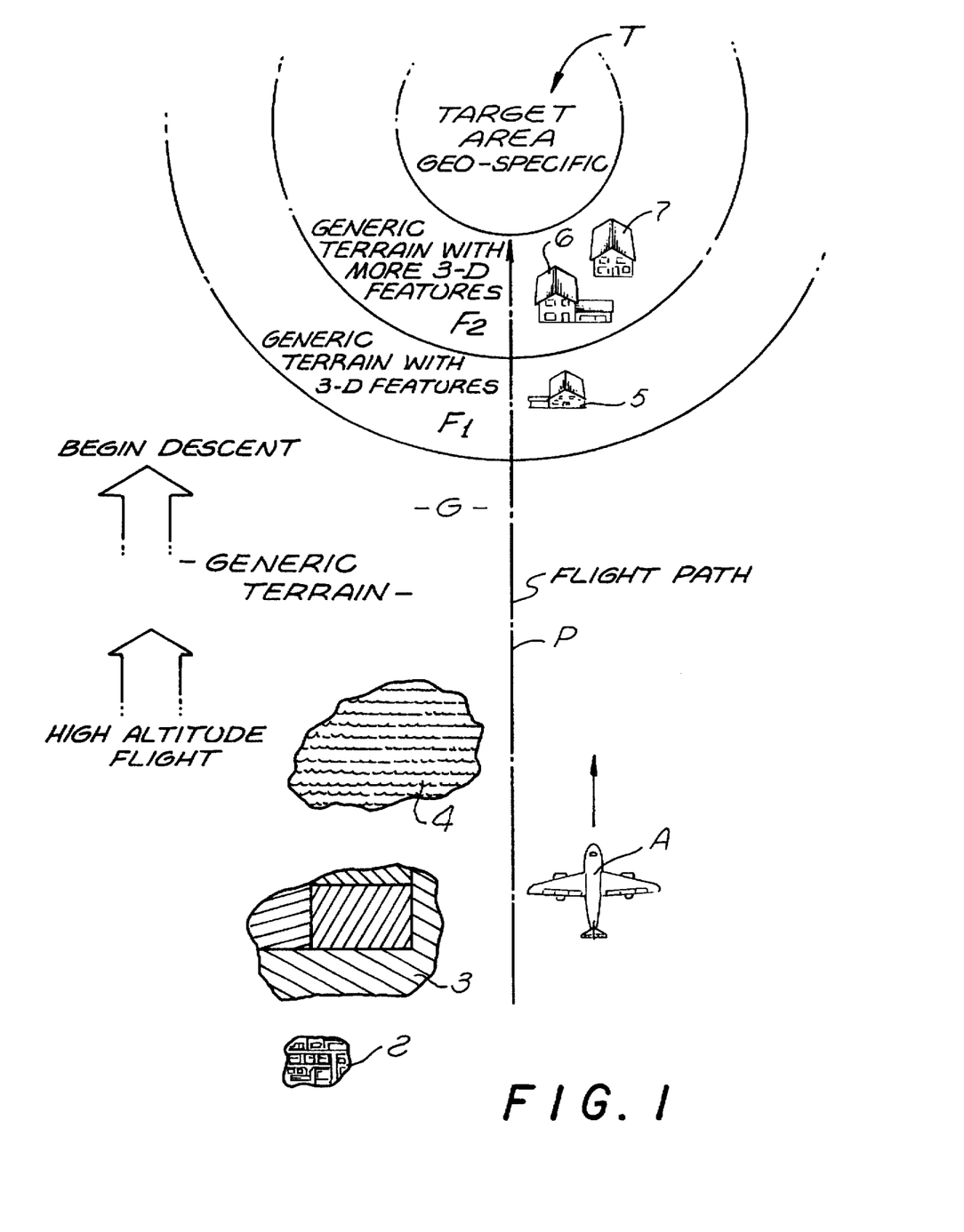
FIG. 1 is a diagrammatic view illustrating the operation of a system of the present invention in relation to a flight path.

Referring to FIG. 1, an aircraft A (lower right) is represented to fly along a path P toward a target area T (top center). Generally, it is contemplated that the aircraft A will fly along the path P over an area G at a relatively high altitude. When it reaches a point of beginning descent, it soon will enter an area F1. As the descent continues, the range to the terrain below gradually closes and in that regard, an advanced area F2 also is represented. Typically, the closure will be gradual and somewhat constant; however, for purposes of simplified explanation, two discrete areas F1 and F2 of progressive closure with the ground are illustrated. Ultimately, it is contemplated that the aircraft A will attain the target area T.

While flying over the area G at a high altitude, the view from the aircraft A likely will include areas of different terrain characteristics, for example, residential, desert, forest, water, agricultural and so on. Sample patch areas representing residential terrain 2, agricultural terrain 3 and water 4 are illustrated. While the sample terrains 2 and 3 are illustrative, it is to be understood that the entire generic area G will be displayed as textured terrain with one or another form of characteristic. Appropriate to a high altitude view (long range) the representations will be two-dimensional.

Pursuing the path P, as the aircraft A descends to a lower altitude over the area F1, representations of generic terrain are supplemented by three-dimensional objects, for example by a house 5. That is, the two-dimensional generic terrain representations are supplemented by some three-dimensional objects. Accordingly, the realism of the display is greatly enhanced.

Over the area F2, with the range further closed, the number of three-dimensional objects may be increased as indicated by the houses 6 and 7. Because the range distance between the aircraft A and the terrain becomes shorter, the houses 6 and 7 are illustrated in greater detail than the house 5. Over the target area T, the display becomes geo-specific. That is, the view is accurate and specific with regard to the actual terrain and three-dimensional objects are displayed.

Recapitulating to some extent, the system as disclosed herein can accomplish a dynamic sequence of views utilizing data from different storage or memory libraries aggregating a manageable data base. Generally, the two-dimensional data for the area G along with the areas F1 and F2 is provided from a sizable number of terrain treatment arrays to appropriately texture the view utilizing the feature identification codes of a theme map. Within the areas F1 and F2, three-dimensional data is drawn from a theme-cell set library to provide an effective number of three-dimensional objects. The objects are located on footprints of the textured two-dimensional display by index references. Within the target area T, geo-specific, high resolution images are provided from detailed photo data taken from a photo data memory.

Figure 2:
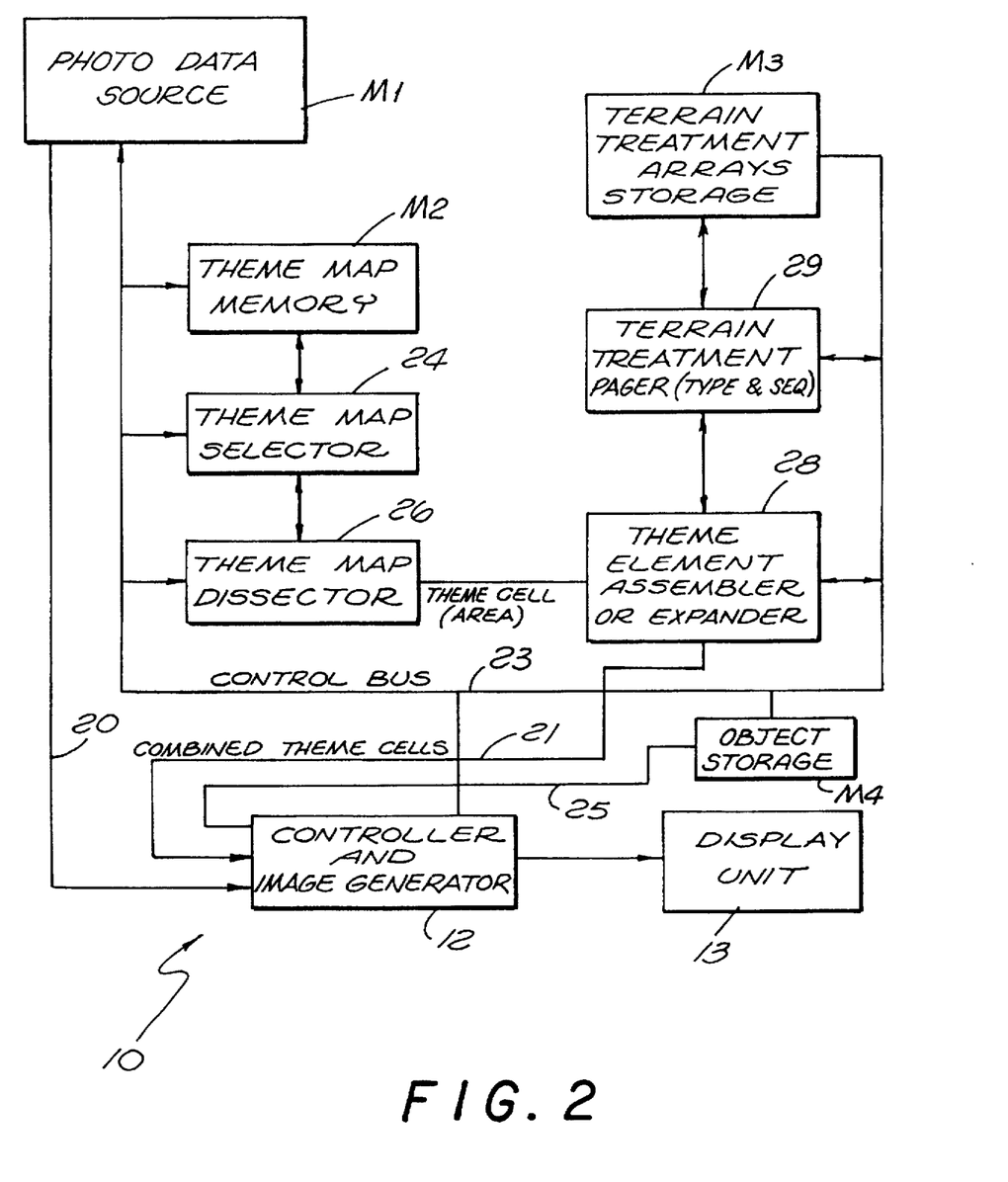
FIG. 2 is a block diagram of a comprehensive image-texturing system utilizing theme cells to generate simulated terrain image data in accordance with an embodiment of the present invention.

Turning now to FIG. 2, a system is shown for accomplishing simulated dynamic images of a passing terrain; an external scene shown in real time for applications such as flight simulation systems. Several forms of certain elements in the system are well known in the prior art, specifically a controller and image generator 12 driving a display unit 13 (FIG. 1, bottom). Forms of the controller and generator 12 and the display unit 13 (e.g. CRT) are well known that may be readily adapted for use in the system of FIG. 2 to variously implement the present invention.

As explained above, depending on the phase of the operation, the controller and generator 12 receives different graphics data. Both detailed geo-specific data and theme cell data (with or without three-dimensional object data) are used to provide composite image signals to the display unit 13. For purposes of simplifying the explanation, the component data storage or memories are shown separate in FIG. 2. Specifically, geo-specific data is stored in a photo data source M1 (upper left). The theme map data indicating terrain characteristics for specific areas or theme cells is stored in a theme map memory M2. The treatment array data for texturing displayed theme cells is held in a storage M3. Finally, the three-dimensional object data for populating the theme cells with objects is contained in an object storage M4.

The image generator 12 receives geo-specific data for three-dimensional displays from the source M1 through the bus 20. A bus 21 to the generator 12 carries theme map data indirectly from the memory M2 and the storage M3. Such data provides a two-dimensional textured display. Three-dimensional object data for theme cells passes from the object storage M4 through a bus 25 to the image generator 12. Accordingly, a dynamic display is provided either by geo-specific photo data from the source M1 or as disclosed in detail below by theme cell data with or without three-dimensional objects. Generally, overall control and sequencing is accomplished by the controller and image generator 12 through a control bus 23 that is coupled to all other elements in the system as indicated.

By selectively using geo-specific photo data, two-dimensional theme cell data and three-dimensional object data, the system 10 displays dynamic and realistic terrain images rapidly and economically, without requiring vast amounts of memory. In its final form, the collective data conveys visual images in real time and may be organized in accordance with well known raster scan formats. Processed and formatted, data-represented images are displayed by the display unit 13 (lower right) that may take the form of a cathode ray tube device.

Considering the system of FIG. 2 in greater detail, portions of the theme map are selected from the memory M2 by a theme map selector 24, depending on current position or other display criteria. The selected portion of the theme map is further divided by a theme map dissector 26 to provide specific theme cells (representing discrete areas) to a theme cell expander 28. For example, theme cells may represent forty meter squares that are selectively textured with generic terrain characteristics. In the display, each theme cell may be represented by a pattern of 32×32 texels (pixels). For example, pixel resolution might concentrate to 1.25 meters per texel where cells are 40×40 meters.

The theme cell data as received by the expander 28 are textured by terrain characteristic data received from the storage M3 through a terrain treatment pager 29. From the expander 28, theme cell data, with texture data, is supplied to the image generator 12 through the bus 21. Additionally, under certain circumstances, (close range) object data for populating the theme cells is supplied from the storage M4 to the image generator 12 through the bus 25.

Essentially, data for the two-dimensional theme cells of the display is composed cell-by-cell using feature identification codes (FIC's) located at the coordinate point corners of each cell to specify the square contents with regard to themes or characteristics, e.g. forest, water, etc. Thus, in the operation of the system, the image generator and controller 12 maintains the theme cells of a map current and updated, textured with terrain image data corresponding to the area over which a flight is being simulated. Essentially, a frame buffer may be utilized for that function, as well known in the prior art. For extensive and detailed treatment of such operations, see the book *Fundamentals of Interactive Computer Graphics*, Foley and Van Dam, 1984.

To explain the detailed operation of the system of FIG. 2, reference now will be made to FIG. 3 graphically illustrating the composition of theme cell data for display. A theme map 101 is coded to indicate terrain characteristics as illustrated. The theme map 101 is indexed by a rectangular arrangement of coordinate points or dots 102. The spacing of the dots 102 defines theme cells. For example, the dots 102A generally define theme cells 106 designated A, B and C. That is, each set of four dots 102 defining a square area similarly defines a theme cell. In one embodiment of the developed system, the theme map 101 comprises an array of 1,024×1,024 theme cells 106.

The index points or dots 102 each are referenced to data indicating a terrain characteristic. That is, for each of the dots 102, a feature identification code (FIC) is provided in the theme map memory M2 (FIG. 2) to indicate a terrain characteristic. For example, a feature identification code of "1" might indicate a characteristic of water surrounding a specific dot 102. Thus, the theme map is indexed to define coordinate locations and associated terrain characteristics.

With the terrain characteristic representations of the feature identification codes specified for the corners (dots 102) of a theme cell, it can be textured with characteristic-theme data using modulo addressing, from a library 103 (upper right) of treatment arrays 105. Thus, a composite display of multiple theme cells visually indicates a characterized terrain.

The four FIC's specified for the inidicias or dots 102 (FIG. 3) at the corners of each of the theme cells 106 (in theme map 101) determine the terrain treatment or treatments that will be textured to appear in each theme cell 106. As explained above, each FIC indicates a type of terrain, such as forest, ocean or residential. In code for example, forests might be designated "0", oceans "1", residential areas "2" and so on. For cells cornered by codes to represent more than one theme characteristic or treatment, e.g. forest and ocean, texture combinations are formulated based on rules as explained below.

When the FIC's for the four corners of a theme cell 106 are identical, a portion of an appropriate terrain treatment array 105 from the library 103 simply is copied and texture mapped onto the theme cell. The copying or allocation is illustrated in FIG. 3 by sets of projection lines PL1 and PL2 extending from the cells 106 in the map 101 to select treatment arrays 105F (forest) and 105R (residential). The defined portions or fragments of the arrays 105F and 105R are then used to texture the theme cells 106 (A, B and C) as indicated by projection lines PL3 and PL4 on enlarged theme cells 106T.

To consider the operation in greater detail, assume as illustrated that the four corner dots 102B defining a theme cell 106(A) specify terrain covered with forest. Accordingly, the feature identification codes at the corners of the theme cell would be "0", "0", "0", and "0", indicating the theme cell 106(A) is to reveal entirely forest terrain. Therefore, as illustrated by the projection lines PL1, a segment 110 (A') of the forest array 105F is used to texture the theme cell 106T(A) as indicated by the projection lines PL3 extending to the enlarged theme cell 106T(A) in the projection 112.

Somewhat similarly to the theme cell 106(A), a theme cell 106(C) lies entirely within a portion of the terrain theme map 101 that is covered by a single terrain characteristic, i.e. residential area. Therefore, as illustrated by the projection lines PL2 and PL4, a segment 114(C') is designated in the array 105R to texture the theme cell 106T(C) entirely with generic residential terrain. Thus, while preserving order in the extraction of texture segments from the terrain treatment arrays, theme cells are appropriately textured.

Now, consider the center theme cell 106(B) with two corners (points or dots 102) in a terrain covered by forest and two corners in a residential terrain. The theme cell 106(B) is to be textured by combining one fragment of a second array segment 118(B') of the forest array 105(F) with a second fragment 120(B') from the residential array 105R. The method for combining these two fragments now will be explained in greater detail.

Progressively, segments of the terrain treatment arrays 105 are used to generate the detailed contents of theme cells, cell-by-cell. That is, adjacent or neighboring segments are applied as texture in sequential order as illustrated in FIG. 3. Typically, a raster pattern sequence is employed, taking segments or fragments of segments from a texture array in order to preserve the original positioning. This technique avoids a patchwork appearance characteristic of repeating a single terrain segment for neighboring theme cells 106. Also, seamless edges are provided between terrain treatment segments in neighboring theme cells 106.

Figure 4:
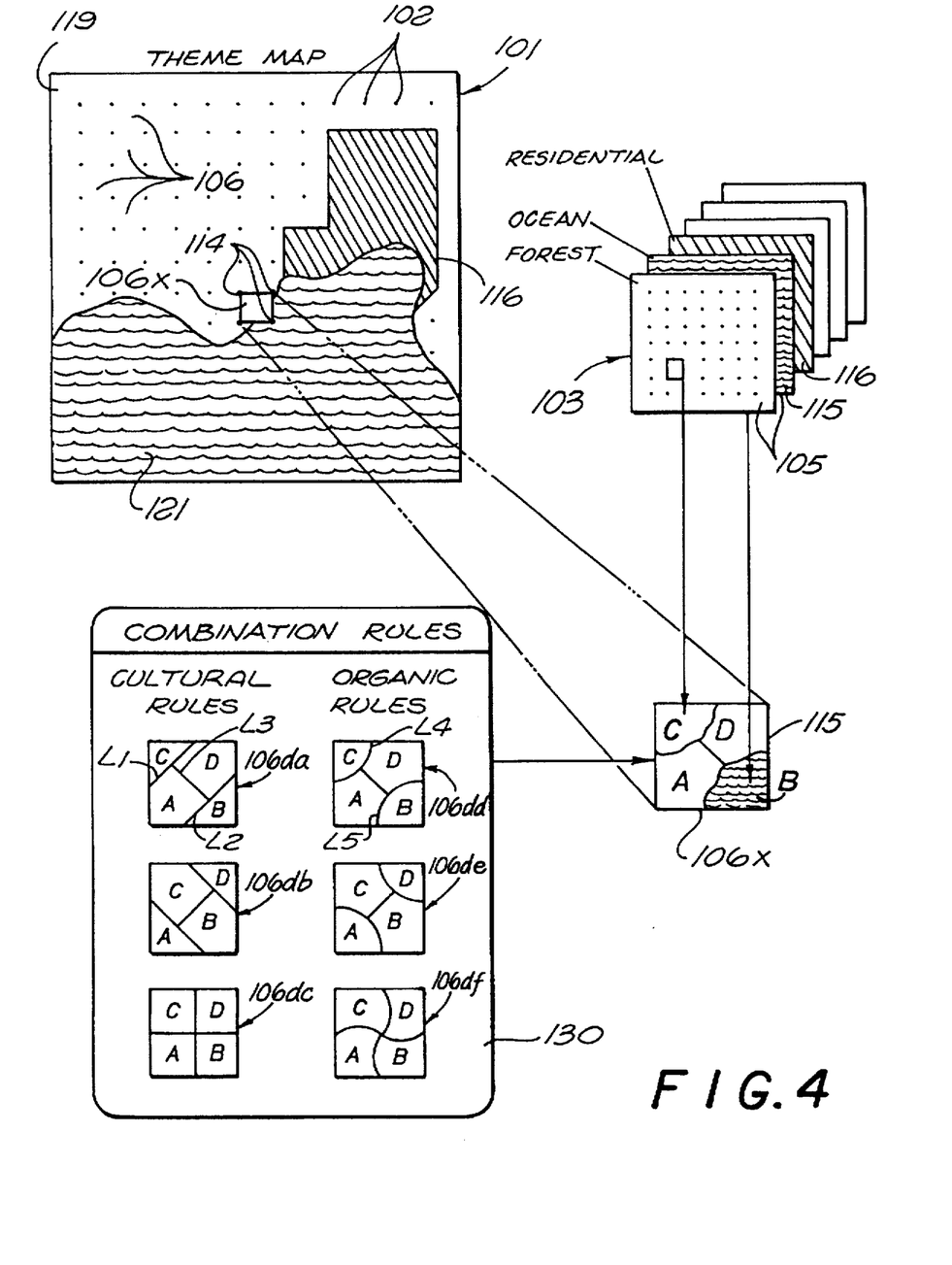
FIG. 4 is a diagrammatic representation of the theme map illustrating operations for a single theme cell to provide representations of selected terrain treatments in accordance with a set of combination rules.
Figure 6:
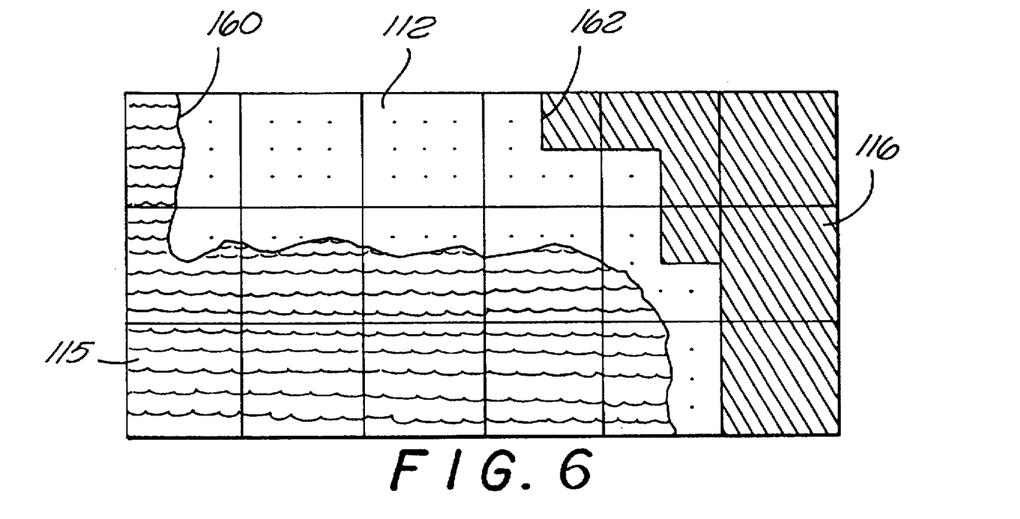
FIG. 6 is a diagrammatic representation of an exemplary theme map illustrating the operation of the system whereby boundaries within a theme cell are constructed in accordance with organic combination rules for natural terrain and inorganic combination rules for man-made terrain.

Reference now will be made to FIGS. 4 and 6 somewhat concurrently in relation to the resolution of boundaries between different terrain characteristics represented by theme cells 106 in the theme map 101. Generally, the resolution involves quartering theme cells for selective texturing. Again, the operation is illustrated by projections. A specific theme cell 106X designated by dots 114 is illustrated as an enlarged projection 115 quartered for selective texturing. As described in detail below, texture fragments for the quartered theme cell 115 are taken from the library 103 (upper right) of arrays 105 in accordance with logic illustrated by a block 130.

Realistic boundaries within the specific theme cell 106X (FIG. 4, lower right) between different terrain quarter portions (A, B, C, and D) are resolved by the characteristics of the adjoining terrains. In the case of natural areas, such as forest, ocean and wild grass range, a sinuous merging rule (organic) preferably is applied, as illustrated by the organic boundary 160 (FIG. 6). For unnatural areas, such as agriculture fields, residential areas and industrial tracts, an inorganic merging rule is used, as illustrated by the inorganic boundary 162 as shown in FIG. 6.

A somewhat critical requirement in the development of combination rules (both organic and inorganic) is that boundaries in adjacent theme cells match at the edges. One way to guarantee that the textures of adjacent theme cells 106 match at the edges is to use boundaries that consistently terminate at the midpoint between the corners. This allows texturing a sequence of adjacent theme cells without noticeable breaks in a seam or terrain-characteristic demarcation line.

Another key to effective theme cell combinations is to avoid distinctive-character border patterns. An example of a distinctive character pattern might be a display with a sharp point like the tooth of a saw blade. Specifically, a straight boundary across several theme cells 106 (FIG. 3) between residential and forest terrain might begin to resemble a saw blade with the sharp point repeating at the theme cell interval. Thus, when a rule is to be applied over and over, several different forms of the theme cell rule should be available for use according to a pattern so as to avoid a repeating texture pattern.

As indicated, for the exemplary embodiment, six combination rules are disclosed, three inorganic and three organic. The rules variously quarter cells as illustrated into areas A, B, C, and D (FIG. 4). The inorganic and organic rules are exemplified in a rules block 130 and are applied to quarter or divide theme cells 106*da*, 106*db*, 106*dc*, 106*dd*, 106*de* and 106*df* quadrative portions A, B, C and D using curved and straight lines. Specifically, the inorganic cell block 106*da* first is unequally divided by two straight diagonal lines L1 and L2 defining corner apex areas or portions B and C. A perpendicular straight diagonal line L3 then extends between midpoints of the lines L1 and L2 to define corner areas A and D.

The cell block 106*dd* illustrates a division similar to that of cell block 106*a* however using an organic rule. Note that the lines L4 and L5 of the organic cell block 106*dd* are accurate. The dimensions of the cell blocks 106*db* and 106*de* are similar to those of the blocks 106*da* and 106*dd* with the straight diagonal lines offset ninety degrees. The divisions of blocks 106*dc* and 106*df* use rectangular quartering.

To consider an example with reference to FIG. 4, three corners or dots 114 (FIC's) of a theme cell 106X (in theme map 101) are located in forest terrain 119 and one corner is located in ocean terrain 121. First, as both bordering terrains are natural, the theme element assembler or expander 28 (FIG. 2) selects one of the organic rules as illustrated by the blocks 106*dd*, 106*de* or 106*df*. Specifically assume the dimension of the block 106*de* is selected as illustrated by the enlarged projection of the cell 106X. The theme element assembler 28 generates the resulting theme cell 106X by selecting a segment of water for the lower right quadrant B. A forest characteristic theme then is used to texture the remaining three quadrants A, C and D.

As explained, the assembler 28 varies the rule to increase the natural-looking characteristic of borders. The operation tends to avoid the problem (sawtooth) discussed above attendant repeated application of one rule creating a repeated border pattern between regions.

Rule selection may be variously implemented in the logic of the assembler 28 (FIG. 1) and in one embodiment simply involves a truth table. Considering the cell 106X (FIG. 4) the lower, right corner B is to represent water while the remainder of the cell A, C, and D is to represent forest. Considering the three organic rules illustrated by blocks 106dd, 106de and 106df, it will be apparent that only the first rule would be appropriate. Thus, the selection is apparent. In the system, a truth table can be addressed based on the quadrants. In the assumed example:

| Quadrant | Code | Characteristic |
|----------|------|----------------|
| A        | 0    | forest         |
| B        | 1    | water          |
| C        | 0    | forest         |
| D        | 0    | forest         |

It is apparent that the truth table should indicate application of the rule of block 106dd. The rule of block 106de would be appropriate for divisions where a unique characteristic occupies the upper right or lower left quadrant. The rule of block 106df is applicable where four characteristics are present. In some situations, there will not be an obvious or apparent favored rule. For such cases, the truth table simply will pseudo-randomly designate one of the alternatives.

The corner data (feature identification codes) for the dots 102 defining each theme cell is supplied to the assembler 28 (FIG. 2) which also receives the theme data from the array storage M3 addressed by the pager 16. With such data, the assembler 28 textures the theme cell in accordance with the principles described above, as by specifying the individual texels.

Recapitulating, textured theme cells may be the sole data for a display. Alternatively, the display data may comprise textured theme cells along with three-dimensional objects. As a further alternative, as within the target area T (FIG. 1) the display may comprise geo-specific three-dimensional data as described above.

In some situations, the image generator 12 (FIG. 2) may produce a group of texels (pixels) for a theme cell that represent an area equal to or smaller than forty meters. Such a situation may be appropriate for a craft flying at a low altitude, requiring high resolution of the ground. As indicated above, in such situations, the controller and generator 12 determines whether geo-specific data is stored in the source M1 for the geographic area involved. Typically, if the geographic area is important to the purpose of the simulation as for the target area T (FIG. 1), the photo data will be available. If so, using techniques and apparatus well known in the prior art, RGB (red, green, blue) texel data is fetched from the photo data source 18 (FIG. 2) and sent to the image generator 12 on the bus 20. Accordingly, the data is assembled in accordance with well known principles of computer graphics technology to drive the display 13.

Typically, as explained above, for the area G along with the areas F1 and F2 (FIG. 1) no photo data would be available. However, also as explained above, texture data along with supplemental three-dimensional data is available for theme cell application. For these areas, the system 10 (FIG. 2) assembles textured theme cells from the theme map 101 (FIG. 3) along with FIC data that is sent to the image generator 12. Texture data is supplied. Additionally, data for three-dimensional objects, e.g. houses, may be provided from the object storage M4 (FIG. 4) to the image generator 12 to supplement the display. Thus, in accordance with the disclosed embodiment, data of three distinct forms is selectively employed to formulate a dynamic simulated terrain display. Consider now, the structure of FIG. 2 to accomplish the two-dimensional theme cell treatment.

Figure 3:
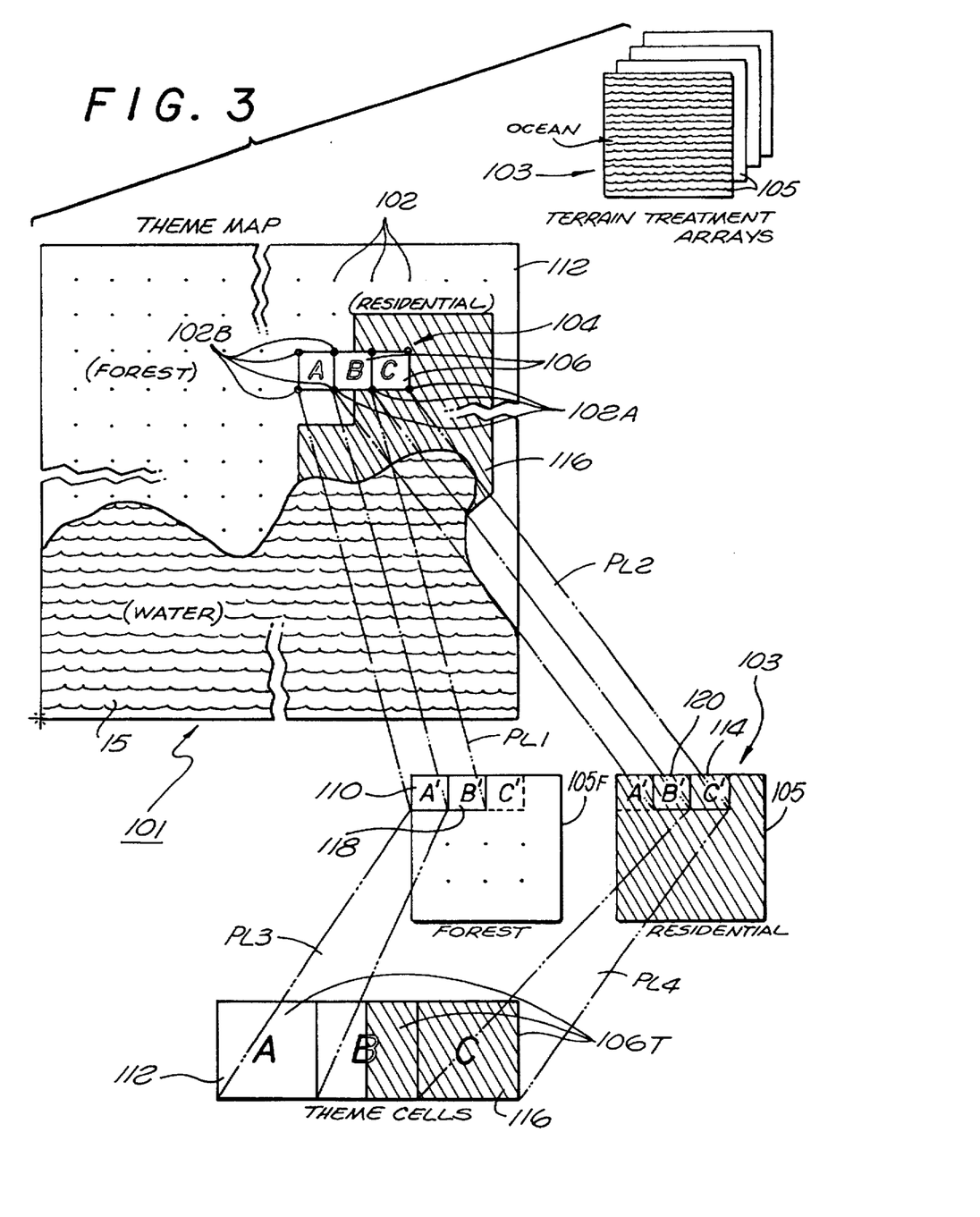
FIG. 3 is a diagrammatic representation to illustrate the operation of the system of FIG. 2 in composing a textured theme map for display, dissected into theme cells, which contain representations of selected terrain treatments.

The terrain treatment arrays storage M3 (FIG. 2, upper right) contains a library of characteristic theme arrays 103 (FIG. 3, upper right). The theme characteristics of various terrains are used to texture the theme cells 106 (FIG. 3). A theme map selector 24 (FIG. 2, center) selects the current theme map data from the theme map memory M2. As graphically further explained in detail below, a theme map dissector 26 composes individual theme cells using the FIC data for the represented four dots 102 bounding each theme cell. As indicated, terrain characteristic data for texturing individual theme cells is stored in the terrain treatment storage M3 as the library 103 of characteristic terrain arrays (FIG. 3, upper right). Specifically, the library 103 includes theme map arrays 105 for forest, water, residential, agriculture and so on. Select terrain themes indicated by feature identification codes are fetched from the storage M3 by the terrain pager 16 for use in the assembler or expander 28. Essentially, the assembler or expander textures theme cells with specified two-dimensional treatments as now will be considered.

Figure 5:
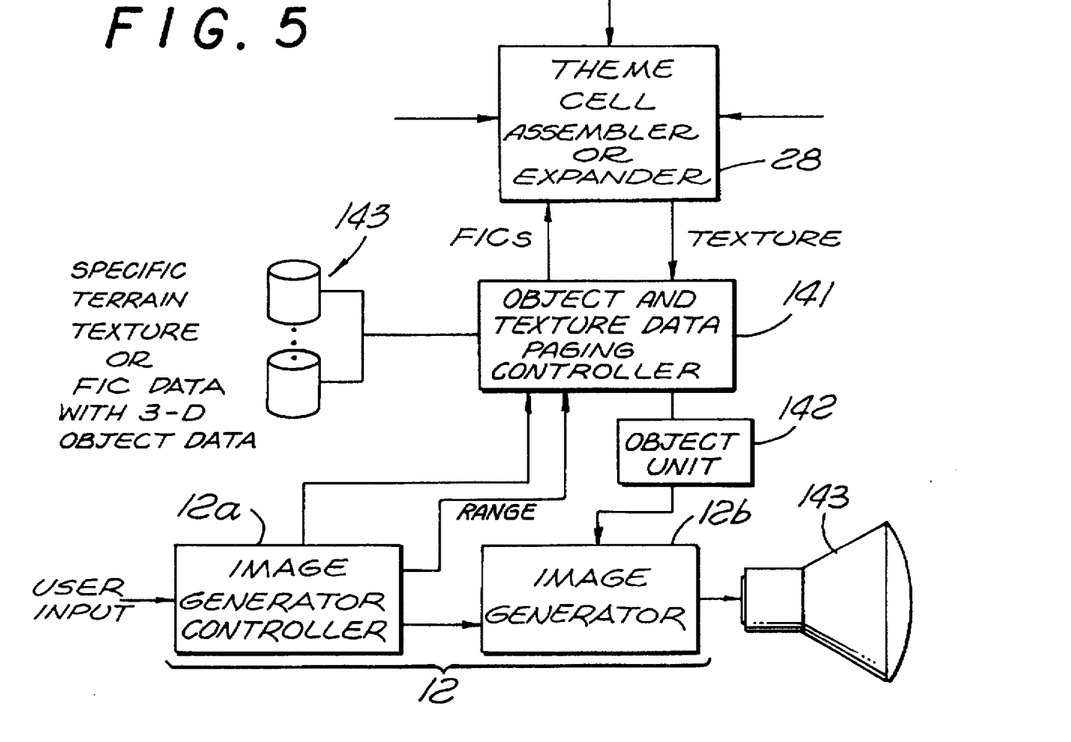
FIG. 5 is a block diagram of a portion of the system illustrating the combination of high resolution specific terrain data and lower resolution FIC data.

Referring now to FIG. 5, a portion of the system now will be considered from another structural aspect. As shown, the memories M1, M2, M3 and M4 illustrated separately in FIG. 2 to simplify the explanation, are collected in a disk storage 143 (FIG. 5). User input to the system, such as from a flight simulation device or the like, is provided to the image controller and generator 12 (FIG. 5, bottom) shown as separate blocks 12a and 12b.

The image controller 12a determines the data fragments or portions of data that are required to form specific new portions of the image being generated. Accordingly, the controller 12a fetches information for these portions through a texture paging controller 141. Specifically, the texture paging controller 141 determines whether geo-specific terrain texture data (three-dimensional, geo-specific) is available from the disk storage 143 for the display. If geo-specific terrain texture is not available, the FIC data for the display is provided from the disk storage 143 by the texture paging controller 141 to the expander 28 as discussed above in relation to FIG. 2. The FIC data for each theme cell is provided to the theme cell expander 28 which uses the FIC data to generate theme cells that are semi-specific. The selected texture then is provided by the theme cell expander 28 to the texture paging controller 141 which sends the texture information through the object unit 142 directly to the image generator 12b. Using the texture data information, the image generator generates the image on the display device, shown in FIG. 5 as a CRT 143.

As explained above, when range closes on the displayed terrain, three-dimensional objects are introduced on footprints of the theme cell display. The operation for such progressive displays initially will be considered graphically with reference to FIG. 7.

Figure 7:
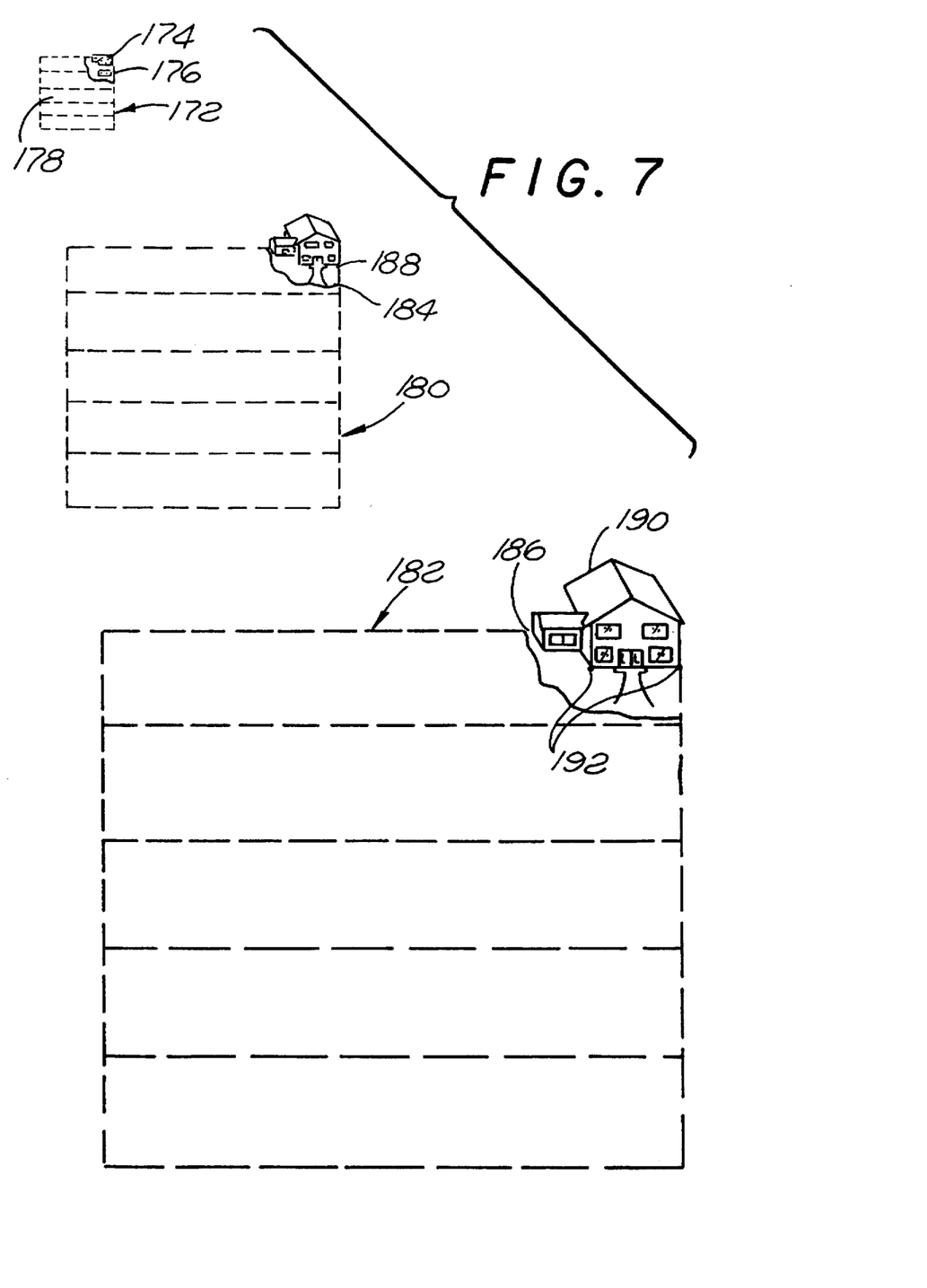
FIG. 7 is a diagrammatic view illustrating an aspect of the operating system of FIG. 2.

If geo-specific terrain texture is not available and the range distance is great, semi-specific texture data is provided to accomplish a residential display component 172 as shown in FIG. 7, upper left. The display component 172 is depicted as square sample, representative of several theme cells for example, and for purposes of simplification showing detail only at the upper right corner 176. At the long range of the display component 172, a house in the semi-specific display is manifest simply as a two-dimensional footprint 174. That is, the house simply appears as a two-dimensional form simulating its overall shape. Of course, other footprints would occupy the remainder of the display component 172 in an actual display, and at relatively high altitudes, the display would appear realistic.

Now, assuming that the path of flight approaches the display component 172, its area grows. For example, closing the range on the display component 172 would result in larger components represented in FIG. 7 as sample display components 180 and 182. Again, only the upper right corners 184 and 186 of the display components 180 and 182 respectively illustrate representative detail.

Considering the display component 180, in accordance with the disclosed embodiment, three-dimensional objects appear on select footprints. As illustrated, a house 188 now appears on the footprint 174 of the display component 172. Essentially, object data for the house 188 is stored and cued for display when the range closes to an appropriate distance. The house is oriented and located by corner reference points on the footprint 174 (not shown).

Further closing the range results in the display component 182 showing an enlarged house 190. Again, the display is semi-specific; however, it effectively includes detailed, three-dimensional objects to considerably improve the realism.

In a simulator application, as the flight path progresses to reveal a closing range on the display component 172 and ultimately show the display component 182, actual flight is simulated. That is, from the display component 172, showing the footprint 174 hinting the presence of a house, the scene gradually changes with reduced range. Ultimately closing of the range results in a smooth and gradual transition from the house footprint 174 to the house 190. Thus, objects grow on footprints simulating the footprint 174 of closing range.

The data for three-dimensional objects as the house 190, is stored in a terrain scene (FIG. 5). As the range closes, the data paging controller 141 is cued to provide object data to the object unit 142 for preliminary processing and introduction into the display.

The formation and scaling of objects in computer graphics displays is very well known along with the placement of objects on specific locations. In that regard, see the above-referenced book *Fundamentals of Interactive Computer Graphics*, Foley and Van Dam, Addison-Wesley Publishing Company, 1984, specifically the section beginning on page 325 entitled "Object Placement and Instance Transformations".

The object unit 142 may incorporate a current transformation matrix (CTM) as well known in the prior art for placing the house 190 as shown in the display component 182 on the location coinciding to the footprint 174 as shown in the display component 172. Generally, as well known in the prior art, the modeler, incorporating a current transformation matrix, matches reference points 192 on the house footprint to the corners of the house 194. Accordingly, the house 190 is scaled to the footprint, both growing as the range closes.

Of course, the system of the present development may be variously implemented; however, as illustrated in FIG. 5, the object unit 142 (incorporating the CTM) is shown separately to accomplish preliminary modelling operations for supplying primitives to the image generator 12b in world coordinates. Again, the techniques are well known and widely practiced in the prior art as described in the above-referenced book, *Fundamentals of Interactive Computer Graphics*. Typically, as the flight path of the simulated vehicle further closes the range on an area, as indicated above, a location will be obtained at which geo-specific data is available as taken from the disk storage 143. As explained above, when such data becomes available, the display becomes geo-specific.

In view of the above, it may be seen that the system of the disclosed embodiment utilizes three distinct display formats to accomplish a realistic and economical display as for simulating the scene as viewed from an aircraft along a particular flight path. As explained, if geo-specific data is available, it is utilized to provide the display. If such data is not available, the display is provided utilizing two-dimensional theme cell data affording a very realistic appearance for long range view of a terrain. When the terrain closes, the theme cell display is supplemented with objects utilizing three-dimensional object data definitive of objects that are associated with and locked onto specific areas or footprints of the theme cell data. Thus, at a particular point in the closing range, that is when the aircraft drops to a predetermined altitude, three-dimensional objects begin to appear on specific footprints. As the range further closes, the objects grow and increase in number. Specifically, at different ranges, select objects are introduced into the display so that at low altitudes, the terrain is well-populated with three-dimensional objects.

Considering the operation of the image generator controller 12a (FIG. 5) in combination with the image generator 12b, reference will now be made to FIG. 8 indicating a flow diagram. Essentially, as indicated above, user input to the controller 12a includes specific location information as well as altitude. The location and altitude data is available as illustrated by the block 202. The initial query is illustrated by a block 204 for a determination of whether or not geo-specific data is available from the disk storage 143 (FIG. 5). If geo-specific data is available, such data is processed as indicated by block 206 and utilized for the display, block 208.

Returning to the query block 204, if no geo-specific data is available, feature identification codes are fetched from the disk storage 143 as indicated by a block 210. A query then follows for the process of composing theme cells. Specifically, the query block 212 involves a determination of whether the area is bounded by similar feature identification codes or codes representing different terrain characteristics (FIG. 4). As explained in detail above, if only a single terrain is represented, a single terrain treatment is fetched for texturing as indicated by the block 214. Alternatively, if more than one terrain exists, different terrain treatment array data is fetched and combined as indicated by the process block 216.

Figure 8:
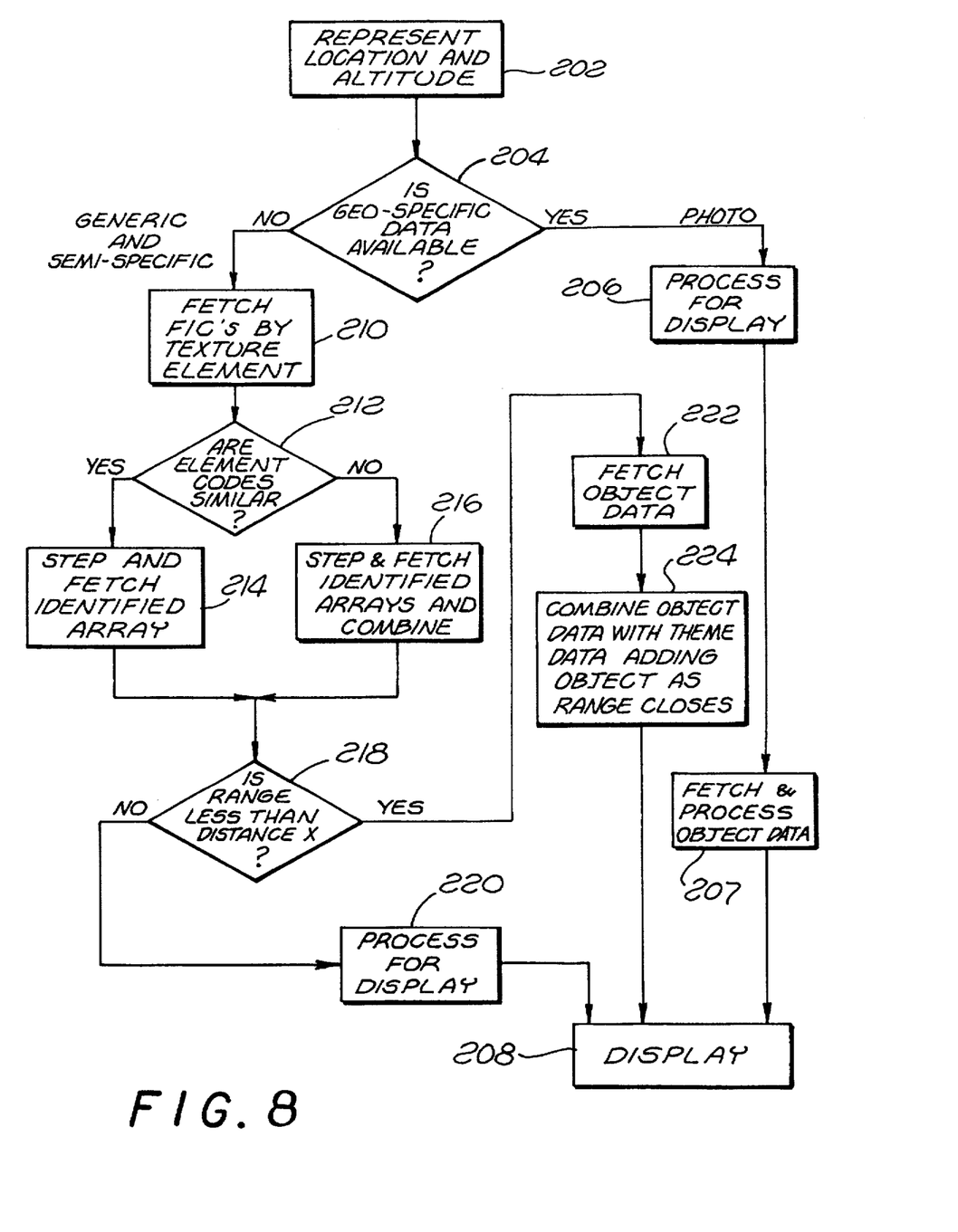
FIG. 8 is a flow chart indicating the process attendant the operation of the system of FIG. 2.

Whether a texture cell involves a single terrain or multiple terrains, the next process step involves determining the range of the terrain, specifically, is the range less than a predetermined distance X? The step is illustrated by the query block 218 in FIG. 8. If the range or altitude is not less than a predetermined distance, the operation proceeds to the block 220 which simply involves processing the theme cell data for display as indicated by the block 208. However, if the range is less than a predetermined distance, the operation proceeds to fetch three-dimensional object data from the disk storage 143 (FIG. 5) as indicated by the block 222 (FIG. 8). The object data is then combined with the texture cell data as explained above (FIG. 7) placing objects, e.g. houses on footprints, e.g. house plan areas. Finally, as represented by the block 224, as the range closes, additional objects are placed to further populate the theme cells. Accordingly, both two-dimensional and three-dimensional data is supplied to the display 208 to provide a realistic view. Thus, the process attains a relatively realistic appearance with reasonable memory requirements as explained in detail above.

Although the invention has been described in terms of a preferred embodiment thereof, other embodiments that are apparent to those of ordinary skill in the art are also within the scope of the invention. Accordingly, the scope of the invention is intended to be defined only by reference to the appended claims.

What is claimed is:

1. An image texturing system for generating simulated terrains or external scenes as for applications such as flight training, said image texturing system including an image generator for generating visual real-time images for display on a display device, said texturing system further comprising:

means for storing a theme map having index identifiers defining a plurality of theme cells disposed in a grid pattern, wherein said theme cells have edges and corners, and wherein said index identifiers indicate geographic terrain characteristic themes and define said corners of said theme cells;

means for storing terrain treatment arrays of said geographic terrain characteristic themes for application to said theme cells; and means for applying at least part of at least one of said terrain treatment arrays to texture said theme cells whereby a single terrain treatment array is applied when said index identifiers for a theme cell represent similar geographic terrain characteristic themes, and a plurality of terrain treatment arrays are applied when said index identifiers for said theme cell represent different geographic terrain characteristic themes, said plurality of terrain treatment arrays applied in accordance with a sinuous merging rule for natural terrains and an inorganic merging rule for unnatural terrains, such that boundaries terminate at an edge of said theme cell substantially on a midpoint between corners.

2. An image texturing system as defined in claim 1 additionally comprising means for generating a selected high resolution portion in said real-time visual image from photographic data stored in a photo data source.

3. An image texturing system as defined in claim 1 wherein said terrain treatment arrays are larger than intervals between said index identifiers in said grid pattern.

4. An image texturing system as defined in claim 1 wherein said terrain treatment arrays representing each of said geographic terrain characteristic themes have a plurality of subportions arranged in an array, each subportion selected sequentially when applied to texture theme cells defined by neighboring groups of index identifiers.

5. An image texturing system as defined in claim 1 additionally comprising:

means for storing object coordinate data;

means for storing three-dimensional object data representative of objects and identified with said object coordinate data; and structure for selectively processing said three-dimensional object data to generate objects on said theme cells at locations in accordance with said object coordinate data, including means for selectively processing in accordance with a range to a simulated scene.

6. A computer graphics system for use with an image generator to generate terrain image data for a display, comprising:

memory means for storing theme maps of specific geographic terrains;

selection means controlled by said image generator for selecting a current theme map and dissecting said current theme map to generate index identifier representations of geographic terrain types present within a current theme cell;

means for storing a plurality of geographic terrain treatment arrays;

means controlled by said image generator for fetching representations of select geographic terrain treatment arrays as indicated for said geographic terrain types; and theme element assembler means for receiving said index identifier representations of said geographic terrain types and said select geographic terrain treatment arrays to provide representations of a combined theme cell to said image generator, wherein said representations of said combined theme cell include a plurality of geographic terrain treatment arrays, whereby boundaries between such geographic terrain treatment arrays terminate at predetermined junction locations for continuity.

7. A computer graphics system as defined in claim 6 additionally comprising means for generating a selected high resolution portion in said real-time visual image from photographic data stored in a photo data source.

8. A computer graphics system as defined in claim 6 wherein:

said index identifiers are separated by intervals; and said geographic terrain treatment arrays are larger than said intervals.

9. A computer graphics system as defined in claim 6 wherein said terrain treatment arrays representing each of said geographic terrain types has a plurality of subportions arranged in an array, each subportion selected sequentially when applied to texture theme cells defined by neighboring groups of index identifiers.

10. A computer graphics system as defined in claim 6 additionally comprising:

means for storing object coordinate data;

means for storing three-dimensional object data representative of objects and identified with said object coordinate data; and structure for selectively processing said three-dimensional object data to generate objects on said theme cell at locations in accordance with said object coordinate data.

11. A computer graphics system as defined in claim 10 wherein said structure for selectively processing said three-dimensional object data includes means for selectively processing in accordance with a range to a simulated scene.

12. An image generating system for generating simulated terrains or external scenes as for applications such as flight training, said image generating system including an image generator for generating visual real-time images for display on a display device, said image generating system further comprising:

memory for storing a theme map having index identifiers defining a plurality of theme cells disposed in a grid pattern, said index identifiers indicating geographic terrain characteristic themes;

memory for storing two-dimensional terrain treatment arrays of said geographic terrain characteristic themes for application to texture said theme cells, said memory further storing object coordinate data;

means for texturing at least part of at least one of said terrain treatment arrays on said theme cells;

memory for storing three-dimensional object data representative of objects and identified with said object coordinate data;

structure for selectively processing said three-dimensional object data to generate objects on said theme cells at locations in accordance with said object coordinate data;

memory for geo-specific three-dimensional data; and means for selectively processing said geo-specific three-dimensional data for a simulated terrain, when such data is available, instead of said terrain treatment arrays and said object data.

13. An image generating system according to claim 12 wherein said structure for selectively processing said three-dimensional object data includes means for selectively processing in accordance with a range to a simulated scene.

14. An image generating system according to claim 12 wherein said structure for selectively processing said three-dimensional objects into a simulated scene is activated when a range to said scene closes to a predetermined distance.

15. An image generating system as defined in claim 12 wherein said terrain treatment arrays representing each of said geographic terrain characteristic themes have a plurality of subportions arranged in an array, each subportion selected sequentially when applied to texture theme cells defined by neighboring groups of index identifiers.

16. A method for providing simulated terrains or external scenes, as for applications such as flight training, said method for use with an image texturing system including an image generator for generating visual real-time images and a display device for displaying such images, said method comprising the steps of:

storing a theme map having index identifiers defining a plurality of theme cells disposed in a grid pattern, wherein said theme cells have edges, and said index identifiers indicate geographic terrain characteristic themes and define corners of said theme cells;

storing terrain treatment arrays of said geographic terrain characteristic themes for application to texture said theme cells; and applying at least part of at least one of said terrain treatment arrays to texture said theme cells such that a single terrain treatment array is applied when said index identifiers for a select theme cell represent the same geographic terrain characteristic theme, and a plurality of terrain treatments are applied when said index identifiers for said select theme cell represent different geographic terrain characteristic themes, said plurality of terrain treatment arrays applied in accordance with a sinuous merging rule for natural terrains and an inorganic merging rule for unnatural terrains, such that boundaries terminate at the edge of said select theme cell substantially on a midpoint between corners.

17. The method of claim 16 further including the step of generating a selected high resolution portion in said visual real-time image from photographic data stored in a photo data source.

18. The method of claim 16 wherein said terrain treatment arrays are larger than intervals between said index identifiers in said grid pattern.

19. The method of claim 16 wherein said terrain treatment arrays representing each of said geographic terrain characteristic themes have a plurality of subportions arranged in an array, further including the step of sequentially selecting each subportion when applied to texture theme cells defined by neighboring groups of index identifiers.

20. The method of claim 16 further including the steps of:

storing object coordinate data;

storing three-dimensional object data representative of objects and identified with said object coordinate data; and selectively processing said three-dimensional object data, in accordance with a range to a simulated scene, to generate objects on said theme cells at locations in accordance with said object coordinate data.

21. A method for providing simulated terrains or external scenes as for applications such as flight training, said method for use with an image generator for generating visual real-time images and a display device for displaying said images, said method comprising the steps of:

storing a theme map having index identifiers defining a plurality of theme cells in a grid pattern, said index identifiers indicating geographic terrain characteristic themes;

storing two-dimensional terrain treatment arrays of said geographic terrain characteristic themes for application to said theme cells and further storing object coordinate data;

texturing at least part of at least one of said terrain treatment arrays on said theme cells;

storing three-dimensional object data representative of objects identified with said object coordinate data;

selectively processing said three-dimensional object data to generate objects on said theme cells at locations in accordance with said object coordinate data for said display device;

storing geo-specific three dimensional data: and selectively processing said geo-specific three-dimensional data for a simulated terrain, when such data is available, instead of said terrain treatment arrays and said object data.

22. The method of claim 21 wherein said step of selectively processing said three-dimensional object data is active during operating periods when a range to a simulated terrain is less than a predetermined distance.

23. The method of claim 21 wherein said terrain treatment arrays representing each of said geographic terrain characteristic themes have a plurality of subportions arranged in an array, further including the step of sequentially selecting each subportion when applied to texture theme cells defined by neighboring groups of index identifiers.

24. An image generating system for generating simulated terrains or external scenes as for applications such as flight training, said image generating system including an image generator for generating visual real-time images for display on a display device, said image generating system further comprising:

memory for storing a theme map having index identifiers defining a plurality of theme cells disposed in a grid pattern, said index identifiers indicating geographic terrain characteristic themes;

memory for storing two-dimensional terrain treatment arrays of said geographic terrain characteristic themes for application to texture said theme cells, said memory further storing object coordinate data;

means for texturing at least part of at least one of said terrain treatment arrays on said theme cells;

memory for storing three-dimensional object data representative of objects and identified with said object coordinate data;

structure for selectively processing said three-dimensional object data to generate objects on said theme cells at locations in accordance with said object coordinate data, wherein certain of said theme cells include internal boundaries, defined by a set of combination rules which utilize the geographic terrain characteristic themes indicated by said index identifiers to produce said real-time visual images on said display device.

25. An image generating system as defined in claim 24 wherein said structure for selectively processing said three-dimensional object data includes means for selectively processing in accordance with a range to a simulated scene.

26. An image generating system as defined in claim 24 further comprising:

memory for storing geo-specific three-dimensional data; and means for selectively processing said geo-specific three-dimensional data for a simulated terrain, when such data is available, instead of said terrain treatment arrays and said object data.

27. A method for use with an image generator for generating terrain image data to generate images on a display device, comprising the steps of:

storing theme maps of specific geographic terrains;

selecting a current theme map and dissecting said current theme map to generate index identifier representations of geographic terrain types present within a current theme cell;

storing a plurality of geographic terrain treatment arrays;

fetching representations of select geographic terrain treatment arrays as indicated for said geographic terrain types;

receiving said index identifier representations of said geographic terrain types and said select geographic terrain treatment arrays; and providing representations of a combined theme cell to said image generator, wherein said representations of said combined theme cell include a plurality of geographic terrain treatment arrays, whereby boundaries between such geographic terrain treatment arrays terminate at predetermined junction locations for continuity.

28. The method of claim 27 further including the step of generating a selected high resolution portion in said images from photographic data stored in a photo data source.

29. The method of claim 27 wherein:

said index identifier representations define intervals; and said geographic terrain treatment arrays are larger than said intervals.

30. The method of claim 27 wherein each of said terrain treatment arrays has a plurality of subportions arranged in an array, further including the step of sequentially selecting each subportion when applied to texture theme cells defined by neighboring groups of index identifier representations.

31. The method of claim 27 further including the steps of:

storing object coordinate data;

storing three-dimensional object data representative of objects and identified with said object coordinate data; and selectively processing said three-dimensional object data to generate objects on said theme cell at locations in accordance with said object coordinate data.

32. The method of claim 31 wherein said step of selectively processing said three-dimensional object data is active during operating periods when a range to a simulated terrain is less than a predetermined distance.

33. A method for providing simulated terrains or external scenes as for applications such as flight training, said method for use with an image generator for generating visual real-time images and a display device for displaying said images, said method comprising the steps of:

storing a theme map having index identifiers defining a plurality of theme cells disposed in a grid pattern, said index identifiers indicating geographic terrain characteristic themes;

storing two-dimensional terrain treatment arrays of said geographic terrain characteristic themes for application to texture said theme cells, said memory further storing object coordinate data;

texturing at least part of at least one of said terrain treatment arrays on said theme cells;

storing three-dimensional object data representative of objects and identified with said object coordinate data;

selectively processing said three-dimensional object data to generate objects on said theme cells at locations in accordance with said object coordinate data, wherein certain of said theme cells include internal boundaries, defined by a set of combination rules which utilize the geographic terrain characteristic themes indicated by said index identifiers to produce said real-time visual images on said display device.

34. The method of claim 33 wherein said step of selectively processing said three-dimensional object data includes the step of selectively processing in accordance with a range to a simulated scene.

35. The method of claim 33 further including the steps of:

storing geo-specific three-dimensional data; and selectively processing said geo-specific three-dimensional data for a simulated terrain, when such data is available, instead of said terrain treatment arrays and said object data.

* * * * *